Sept. 11, 1923. 1,467,374
C. A. HAGADONE
HARVESTER
Original Filed Oct. 13, 1916
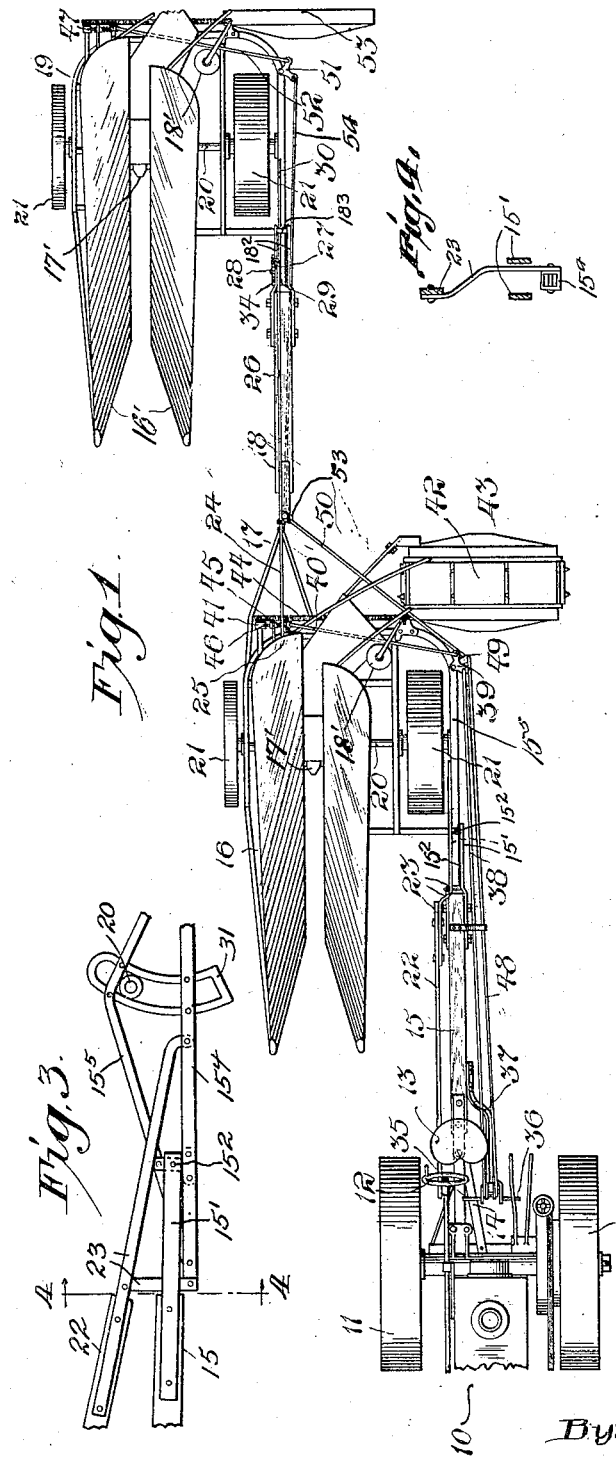
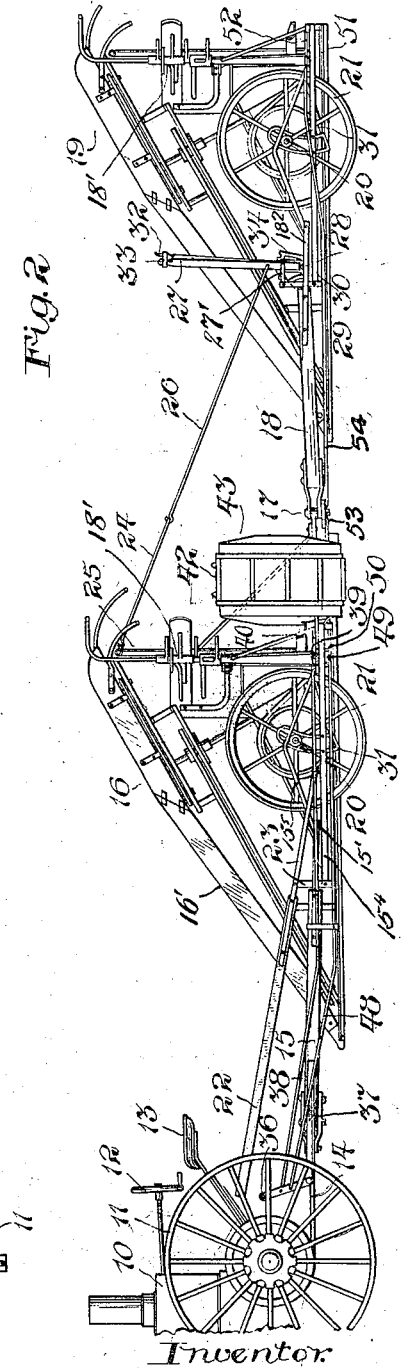
Inventor.
Clinton A. Hagadone.

Patented Sept. 11, 1923.

1,467,374

UNITED STATES PATENT OFFICE.

CLINTON A. HAGADONE, OF WESTERN SPRINGS, ILLINOIS, ASSIGNOR, BY MESNE ASSIGNMENTS, TO INTERNATIONAL HARVESTER COMPANY, A CORPORATION OF NEW JERSEY.

HARVESTER.

Application filed October 13, 1916, Serial No. 125,391. Renewed April 10, 1920. Serial No. 373,003.

*To all whom it may concern:*

Be it known that I, CLINTON A. HAGADONE, a citizen of the United States, residing at Western Springs, in the county of Cook and State of Illinois, have invented certain new and useful Improvements in Harvesters, of which the following is a full, clear, and exact specification.

This invention relates to harvesters, and more particularly to control means therefor, the invention being especially applicable, although not limited, to corn harvesters.

The growing tendency in the operation of harvesters is to hitch or connect two or three together in trailing and offset relation behind a tractor. It has been the general practice to have an operator upon each one of these trailing harvesters to control the movements and the operation of the various parts thereof. Such practice, however, is not economical. The preferred practice is to remotely control the movement of the harvesters and the operation of the various parts from a single point, preferably from the tractor.

It, therefore, is one of the objects of this invention to control the movements of harvesters, and especially a plurality of such harvesters, being propelled, for example, by a tractor.

Another object of the invention is to control the operation of parts of the propelled harvesters in an improved manner from a point adjacent the tractor.

Another object of my invention is to provide a control arrangement for a plurality of motor propelled vehicles adapted to meet all the requirements for successful commercial operation.

These and other objects are accomplished by providing, in combination, a tractor, a plurality of associated harvesters propelled thereby, and means for controlling the movements of such harvesters from the tractor.

The invention is illustrated on the accompanying sheet of drawings, in which—

Figure 1 is a plan view of a portion of a tractor and two trailing harvesters connected in offset relation with respect to each other and operatively connected to the tractor and embodying my invention;

Figure 2 is a side elevation of the same arrangement.

Figure 3 is an enlarged view of the connections between the front and rear draft members and between the adjusting lever and rear draft member; and Fig. 4 is a section on the line 4—4 of Fig. 3.

The various novel features of my invention will be apparent from the following description and drawings and will be particularly pointed out in the appended claims.

As shown in the drawings, I have provided a tractor 10 which may be of any approved type having, among other elements, traction wheels 11 and a hand steering control wheel 12, which is located adjacent the operator's seat 13. The tractor is also provided with a draft link 14, to which is pivotally connected the forward end of a tongue or draft member 15 of a harvester 16, which in this case is a corn harvester. The tongue or draft member 15 takes the place of the usual tongue on the harvester and is provided at its rear end with two extension pieces 15¹ which are pivotally connected at 15² to a lug riveted to the bars 15⁴, 15⁵ forming the rear draft member of the harvester in the same manner that the usual tongue is connected. The bar 15⁴ is connected to the frame of the harvester at the front and rear ends as shown and both bars are connected intermediate their ends to the adjusting yoke 31 which embraces the axle 20 and transmits the pull on the tongue and draft bars to the axle to propel the harvester. Pivotally secured to a rear portion 17 of the main frame of the harvester 16 is a tongue or draft member 18 of another corn harvester 19. The tongue 18 is pivotally connected to the second harvester by two extension pieces 18² and a pivotal connection 18³ in the same manner that the tongue 15 is secured to the first harvester. These harvesters 16 and 19 are connected to each other and to the tractor in such a manner that they are in trailing offset relation to permit the gathering boards 16' of the harvesters 16 and 19 to receive adjacent rows of corn.

Each of the harvesters is provided with the usual cutting knives 17', actuated in the usual manner (not shown) and with binding mechanism 18′. This construction is old in the art of corn harvesters and as no invention per se is claimed in the corn harvester features, they have not been shown in detail. An example of the prior art illustrating this construction is found in the patent to Hazell, 672,212, April 16, 1901.

The front lower ends of these gathering boards 16′ and the cutting knives 17′ must be tilted, as in all harvesters, to be at the proper distance from the ground during actual operating conditions. For this reason means is provided for tilting the frames including the gathering boards of the harvesters. The front harvester 16 has its frame arranged to be tilted about the axle 20 of the carrying wheels 21 of the harvester. The front harvester 16 is tilted about the axle 20 by means of a lever 22, the front end of which is located adjacent the operator's seat 13 in convenient reach for foot operation. This lever 22 is rigidly connected to the draft member 15³ of the front harvester 16 by suitable members 23. It is apparent, therefore, that when the front end of the lever 22 is depressed, the frame of the harvester will be tilted forwardly so that the front ends of the gathering boards will approach the ground, the pivotal connection 15² of the tongue 15 to the harvester permitting this tilting operaiton. In this connection attention is called to the fact that the corn harvester 16 is so balanced that if the downward pressure is withdrawn from the front part of the lever 22, the harvester will automatically return to its initial position, as shown in Figure 2 of the drawings. In other words, there is sufficient weight to the rear of the pivotal point 20 to raise the front part of the gathering boards into normal position when pressure has been relieved from the forward portion of the lever 22. The second harvester 19, which is in trailing relation to the harvester 16, is tilted simultaneously with the forward harvester 16 by a connection including a link 24, which is connected to an upper rear part or vertical frame portion 25 of the front harvester 16, a link 26 connecting the link 24 to a hand lever 27, which is pivotally mounted at 28 on a portion of the rear harvester 19. The tilting motion is transmitted from this hand lever to the frame through a member 27′ fixed to the lever 27 to which is pivoted a suitable link 29 and member 30, connected at one end to link 29 and secured at the other end to the adjusting yoke 31 which embraces the axle 20 of the rear harvester 19.

The tilting movement of the front harvester 16, therefore, is transmitted directly to the rear harvester through the connection above described, that is to say, when the front harvester is tilted, the harvester directly in the rear is automatically tilted at the same time. It is to be understood, of course, that the detent of the hand lever 27 is either removed or the detent lever 32 is locked in inoperative position by a band or the like 33 for holding the detent out of engagement with the segment 34, the hand lever 27, a detent lever 32 and segment 34 on the rear machine being a part of the regular equipment for corn harvesters. Here also, when the front harvester has returned to its normal position, as shown in Figure 2, after having been tilted, it is to be noted that the frame of the rear harvester is free to return to its initial position, which, as in the case of the first harvester, is caused by an excess amount of weight to the rear of the harvester axle 20. It is seen, therefore, that when the operator depresses the forward portion of the lever 22, the frame of the front harvester is tilted forwardly and simultaneously through the connections described, the next harvester to the rear is tilted forwardly in a like manner, and when pressure is relieved from the front part of the lever 22, the harvesters automatically return to their initial positions.

Other control means is also shown in connection with the bundle carriers of the harvesters. In this case the operation of the bundle carriers is controlled remotely by the operator at the rear end of the tractor. The bundle carrier control means in this case includes two levers 35 and 36 which are preferably pivotally mounted upon a bracket 37 secured to the forward end of the front harvester tongue 15. One of these levers 35 is operatively connected by a link 38, pivotally mounted bell crank 39 and link 40 to a standard harvester clutch 41 for controlling the operation of the movable element 42 of the bundle carrier 43 on the front harvester 16. This movable element 42 is actuated by a suitable chain or other driving connection 44 which receives its motion from a moving element of or on the harvester through the clutch 41. By depressing the foot lever 35, the clutch detent 45 will be withdrawn from the clutch dog 46, permitting the movable element of the carrier to be actuated. When the foot lever 35 is released, the spring-pressed detent 45 flies back into its normal position into contact with a clutch dog 46 to prevent transmission of motion to the carrier 42. In a similar manner the other foot lever 36 is connected to the clutch mechanism 47 of the harvester 19, the connection including the link 48 connected at one end to the foot lever and at the other end to a lever 49 pivoted to the front harvester. A link or cable 50 is connected at one end to lever 49 and at the other end to a pivotally mounted bell crank 53 on the second harvester. A link 54 connects the bell crank 53 to the bell crank 51 and a link 52 connects the bell crank 51 to the clutch mechanism 47. It is apparent therefore that by actuating the lever 35 the carrier on the front harvester will be controlled and by actuating the other foot lever 36 the carrier 53 of the harvester in the rear will be controlled. It is apparent also that these carriers may be actuated simultaneously or independently of each other for causing the carriers to operate simultaneously or independently.

By means of these control mechanisms for controlling the tilting of both machines and the operation of the bundle carriers, a simple control of power propelled associated harvesters is provided adapted to meet the various requirements for successful commercial operation.

It is apparent that there may be various modifications of the arrangement herein shown and described, and it is my intention to cover all such arrangements which do not involve a departure from the spirit and scope of my invention as set forth in the following claims.

What I claim as new is:

1. In combination, a plurality of independent harvesting units connected in trailing relation, means for connecting said units together, means for tilting one of said units, lever tilting mechanism for a second unit and a connection from the upper rear portion of the first unit to the lever tilting mechanism of the second unit whereby said second unit will be tilted when the first unit is tilted.

2. In combination, a plurality or harvester units connected together in trailing relation, substantially vertically disposed binding mechanism carried by each of said units, tilting mechanism carried by one of said units, means for connecting said tilting mechanism to another of said units adjacent the binding mechanism carried thereby, and means for tilting said last named unit.

3. In combination, a plurality of corn binding machines connected together in trailing relation, each of said binders having a substantially vertical frame portion near the rear thereof, tilting mechanism carried by one of said binders, means for connecting said tilting mechanism to another of said binders near the upper end of the vertical frame portion carried thereby, and means for tilting said last named binder.

4. In combination, a plurality of corn binding machines connected together in trailing relation, each of said binding machines having supporting wheels, corn gathering and cutting mechanism disposed on one side of said supporting wheels and binding mechanism disposed on the opposite side of said supporting wheels, tilting mechanism carried by one of said machines, means for connecting said tilting mechanism to the rear of another of said machines, and means for tilting said last named machine.

5. In combination, a tractor, a plurality of harvesters having bundle carriers, said harvesters being connected to each other and operatively connected to the tractor, means for tilting said harvesters from the tractor, and means for controlling the operation of the bundle carrier on either one of said harvesters independently of the other.

6. In combination, a tractor, a plurality of harvesters having bundle carriers, said harvesters being connected to each other and operatively connected to the tractor, and means for operating the bundle carrier of one harvester independently of the bundle carrier of the other harvester.

7. In combination, a tractor, a plurality of harvesters having bundle carriers, said harvesters being connected to each other and operatively connected to the tractor, a control connection operable from the tractor and being operatively connected to the bundle carrier on one of said harvesters, and another control connection operable from the tractor and being operatively connected to the bundle carrier on another one of said harvesters.

8. In combination, a harvester having cutting mechanism adapted to be tilted about the axle of the harvester, a draft member having its rear end pivotally connected to the harvester and its front end adapted for connection to a tractor, and a forwardly inclined lever secured to the harvester for tilting the cutting mechanism about the axle and extending forwardly so as to be within easy reach of the operator of the tractor.

9. In combination, a harvester having a frame adapted to be tilted about the axle of the harvester, a draft member secured to the frame and engaging the axle to propel the harvester, a second draft member pivotally connected at one end to the first draft member and adapted for connection to a tractor at its other end and an adjusting lever connected to one of said draft members and extending forwardly within reach of the operator of the tractor for tilting the harvester frame about the axle.

10. Adjusting mechanism for a harvester comprising a draft member adapted for connection to a tractor at one end, a second draft member pivotally connected to the other end, the second draft member comprising a bar connected to the harvester frame and a bar provided with means connected to the axle of the harvester, and an adjusting lever carried by one of the draft members and extending forwardly within easy reach of the operator of the tractor for tilting the harvester about the axle.

11. Adjusting mechanism for a harvester comprising a plurality of draft members pivotally connected to permit relative movement of the members, one of the members being adapted for connection to a tractor at one end, the other member being connected to the harvester, and an adjusting lever for relatively adjusting the members at the pivotal connection to adjust the harvester, the lever being mounted on one of the draft members and extending forwardly within reach of the operator of the tractor.

In testimony whereof I affix my signature.

CLINTON A. HAGADONE.